Sept. 17, 1940.   A. J. COLMERAUER   2,214,811
LINER PERFORATOR AND UNDERCUTTER
Filed Sept. 13, 1938   5 Sheets-Sheet 1

Inventor
ANDREW J. COLMERAUER
By Lyon & Lyon
Attorneys

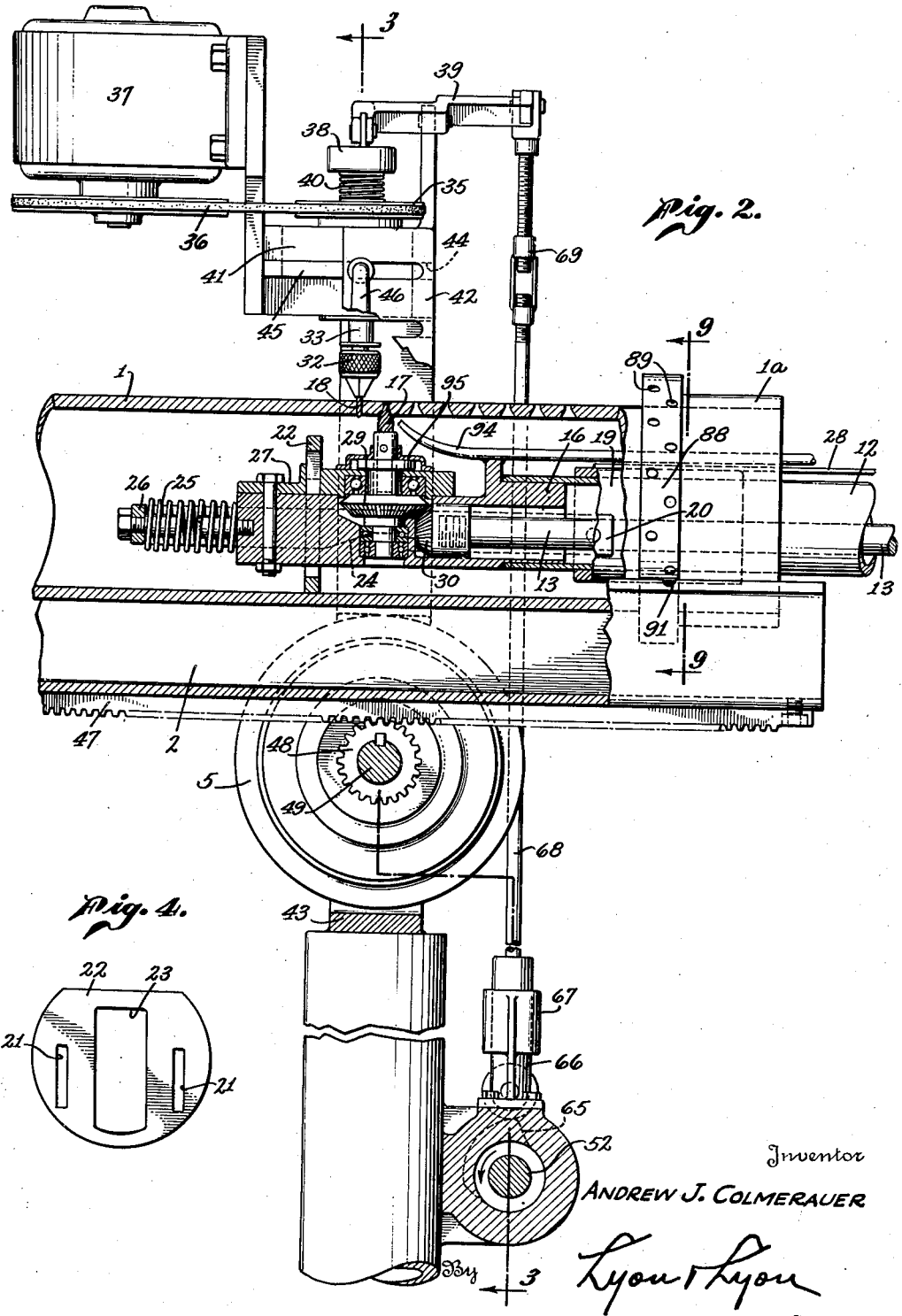

Sept. 17, 1940. A. J. COLMERAUER 2,214,811
LINER PERFORATOR AND UNDERCUTTER
Filed Sept. 13, 1939 5 Sheets-Sheet 3

Inventor
ANDREW J. COLMERAUER
By Lyon & Lyon
Attorneys

Sept. 17, 1940.  A. J. COLMERAUER  2,214,811
LINER PERFORATOR AND UNDERCUTTER
Filed Sept. 13, 1938   5 Sheets-Sheet 4

Inventor
ANDREW J. COLMERAUER
By Lyon & Lyon
Attorneys

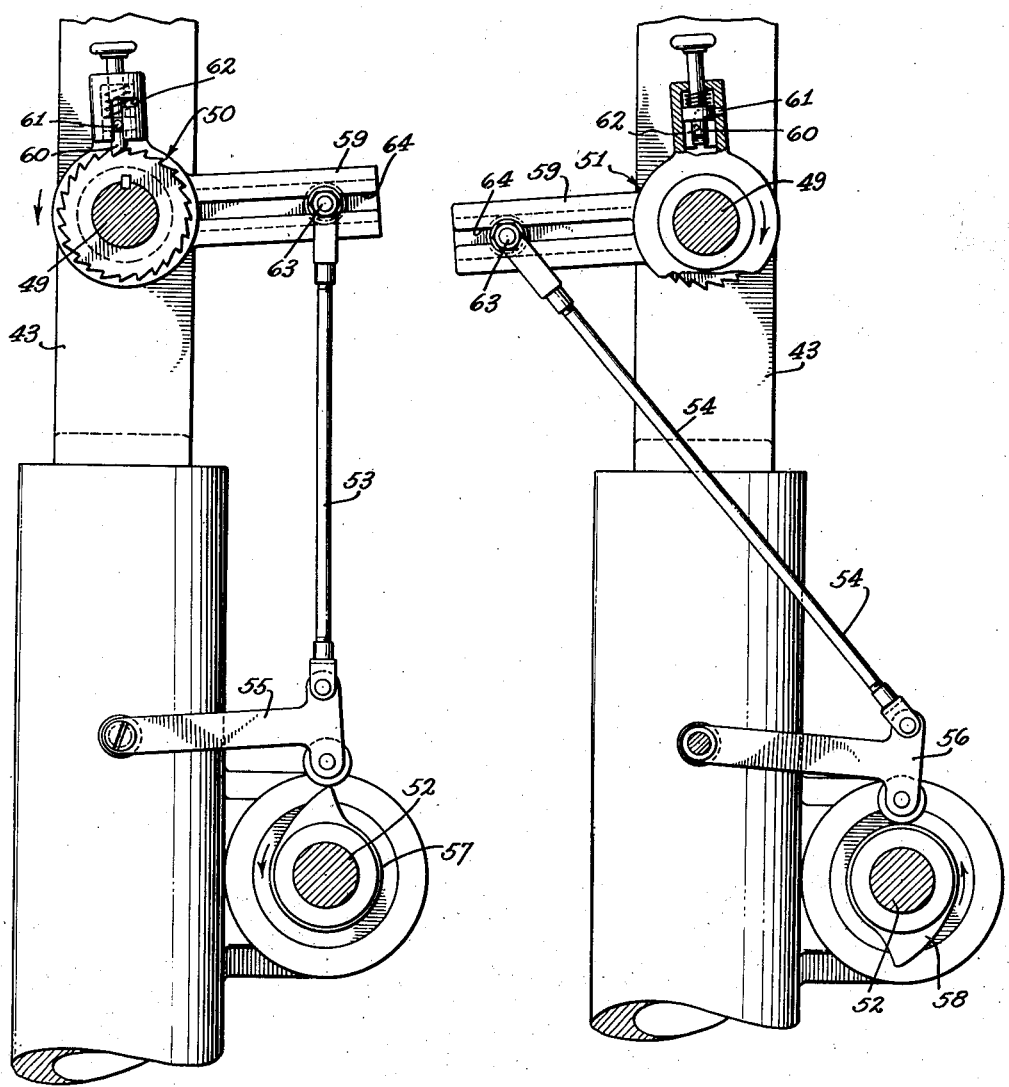

Patented Sept. 17, 1940

2,214,811

UNITED STATES PATENT OFFICE 2,214,811

LINER PERFORATOR AND UNDERCUTTER

Andrew J. Colmerauer, Long Beach, Calif., assignor of one-half to Leo T. Langer, Long Beach, Calif.

Application September 13, 1938, Serial No. 229,696

12 Claims. (Cl. 77—21)

This invention relates to a machine for perforating liners employed in deep wells such as oil wells.

One of the objects of the invention is to produce a machine of simple construction capable of forming undercut perforations; that is to say, perforations that have a larger dimension toward their inner end, as this form tends to prevent the perforations from clogging with sand as the oil flows in through the liner wall.

A further object of the invention is to produce a machine of this kind, capable of drilling and undercutting holes in pipe sections of considerable length.

A further object of the invention is to produce a machine in which the operations of drilling and undercutting the perforations will be carried on substantially automatically.

Further objects of the invention will appear hereinafter.

The invention consists in the novel parts and combination of parts to be described hereinafter, all of which contribute to produce an efficient liner perforator and undercutter.

A preferred embodiment of the invention is described in the following specification, while the broad scope of the invention is pointed out in the appended claims.

In the drawings:

Fig. 2 is a vertical section upon an enlarged scale, passing through the pipe and the undercutter carriage, and particularly illustrating the mechanism for rotating the undercutter and for advancing or raising the same to cause the undercutter to cut into the pipe wall. In this view certain parts are broken away.

Fig. 4 is an elevation of a centering cam plate that is associated with the undercutter carriage. It cooperates with other parts to lift the carriage to lift the undercutter into contact with the pipe wall.

Figure 3:
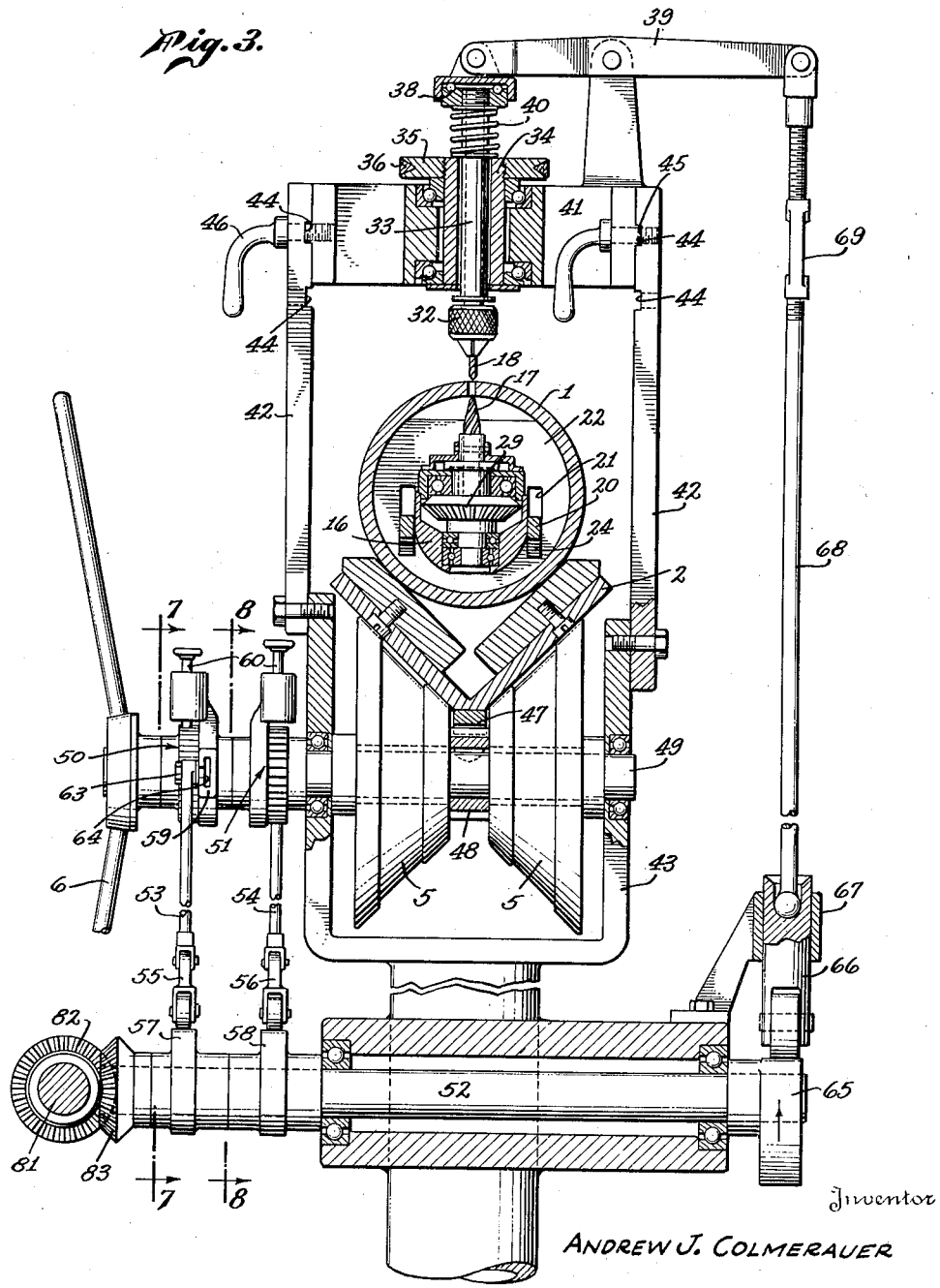
Fig. 3 is a section taken about on the line 3—3 of Fig. 2 passing down through the pipe rest and illustrating details of the automatic feeding mechanism and the means for advancing the drill and the undercutter, certain parts being broken away.

Figs. 7 and 8 are vertical sections on the lines 7—7 and 8—8 of Fig. 3, illustrating details of the feeding mechanism.

Figure 9:
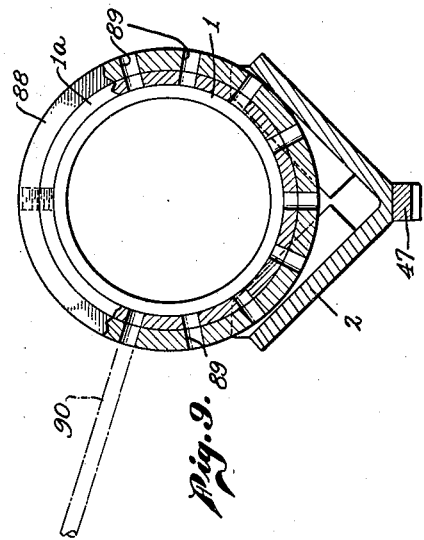

Fig. 9 is a vertical section taken about on the line 9—9 of Fig. 2, particularly illustrating the means employed for rotating the pipe to set it for drilling another row of perforations.

Figure 1:
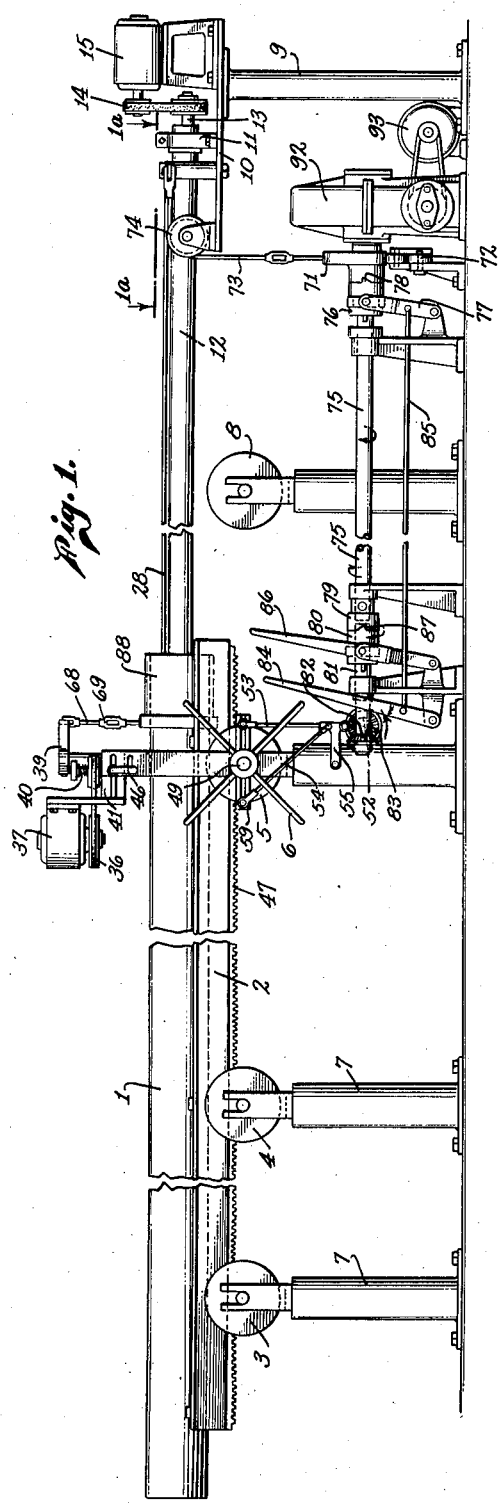
Fig. 1 is a side elevation of a machine embodying my invention and showing a section of liner pipe supported in the machine. In this view certain parts are broken away.

Referring particularly to Fig. 1, the pipe section or liner 1 to be perforated, is supported on a pipe rest 2 forming part of the machine frame, and preferably in the form of a trough of angle shape in cross-section, to support the pipe on its under side. The pipe is supported movably to enable it to be fed past the drill and undercutter to drill and undercut or ream a row of holes. The present machine drills and reams the holes in longitudinal rows in the liner. For this purpose the pipe rest 2 is supported for longitudinal movement on a plurality of rollers 3, 4, and 5, the last named roller being provided with a spike wheel 6 for rotating it by hand when desired. The other rollers roll freely on stands 7. Another roller 8 may be provided if desired, to facilitate handling the pipe and for supporting the forward end of the rest as it moves forward toward the right end of the machine.

At the right end of the machine its frame includes a stand 9 and table 10 with a bracket 11 that supports a cutter bar 12 which is preferably of tubular form, and extends into the adjacent end of the pipe 1 and carrying an inner driven shaft 13 that is rotated by a belt 14 from a motor 15.

Referring now to Figs. 2 and 3, the inner end of the cutter bar carries rigidly an undercutter carriage 16. This carriage carries an undercutter or reamer 17, and means is provided controlled preferably automatically through the end of the cutter bar 12 for periodically lifting the carriage to ream a hole that has already been drilled by the drill 18 operating on the outside. For this purpose the bar 12 is provided with a slidable sleeve 19, to the sides of which two cam bars 20 are attached. These cam bars slide through vertical slots 21 in a centering cam plate 22 in the form of a plate that fits into the bore of the pipe 1 and rests on its bottom. It has a large central guide slot 23 that guides the carriage when it moves up and down. The under sides of the cam bars 20 are formed with cam edges 24 that slide on the lower ends of the slots 21. By pulling the cam bars 20 to the right, the carriage can be raised to the position shown in Fig. 2. But a coil spring 25 thrusting between the end of the carriage 16 and a cross-bar 26 connecting the cam bars, will return the cam bars to an extreme position toward the left, thereby permitting the carriage to drop down. The cam-plate 22 is held in place by a guide bracket 27 bolted to the carriage. The sleeve 19 is pulled toward the right to operate the cam bars 20, by a strap 28 that extends into the pipe above the cutter bar 12, and is actuated periodically in timed relation to the machine cycle, by means to be described hereinafter.

The reamer tool 17 is secured in a chuck that is rigid with a bevel gear 29 driven by a bevel pinion 30 on the end of the driving shaft 13 already referred to, that extends in through the cutter bar 12 (see Fig. 1).

In the operation of the machine, the tool 17 reams out a hole already drilled by the drill 18, and the pipe 1 is fed forward with a step-by-step feed movement as the drilling and reaming progresses. The drill and reamer tool 17, however, are operating simultaneously.

The drill 18 is carried in a chuck 32 on the lower end of a spindle 33 (see Fig. 3) splined in a bushing 34, said bushing carrying a belt pulley 35 continuously driven by a belt 36 from a motor 37. The upper end of the spindle 33 has a thrust bearing 38 in the form of a ball bearing. A rock lever 39 advances the spindle downwardly periodically at the proper time in the cycle and preferably simultaneously with the advance of the reamer. A coil spring 40 thrusting between the bushing 34 and the lower member of the bearing 38, returns the spindle 33 and withdraws the drill 18 after drilling the hole.

The bushing 34 is rotatable in cross-head 41 supported on two flat posts 42 that are bolted below to channel brackets 43. The cross-head is preferably made adjustable. In the present instance notches 44 are provided on the flat posts 42 that are engaged by horizontal tongues 45 on the ends of the cross-head. Clamping screws with handles 46 are provided to clamp the cross-head at the different notches, and in different adjusted positions in the notches depending upon the different diameters of the casing.

Figures 5, 6:
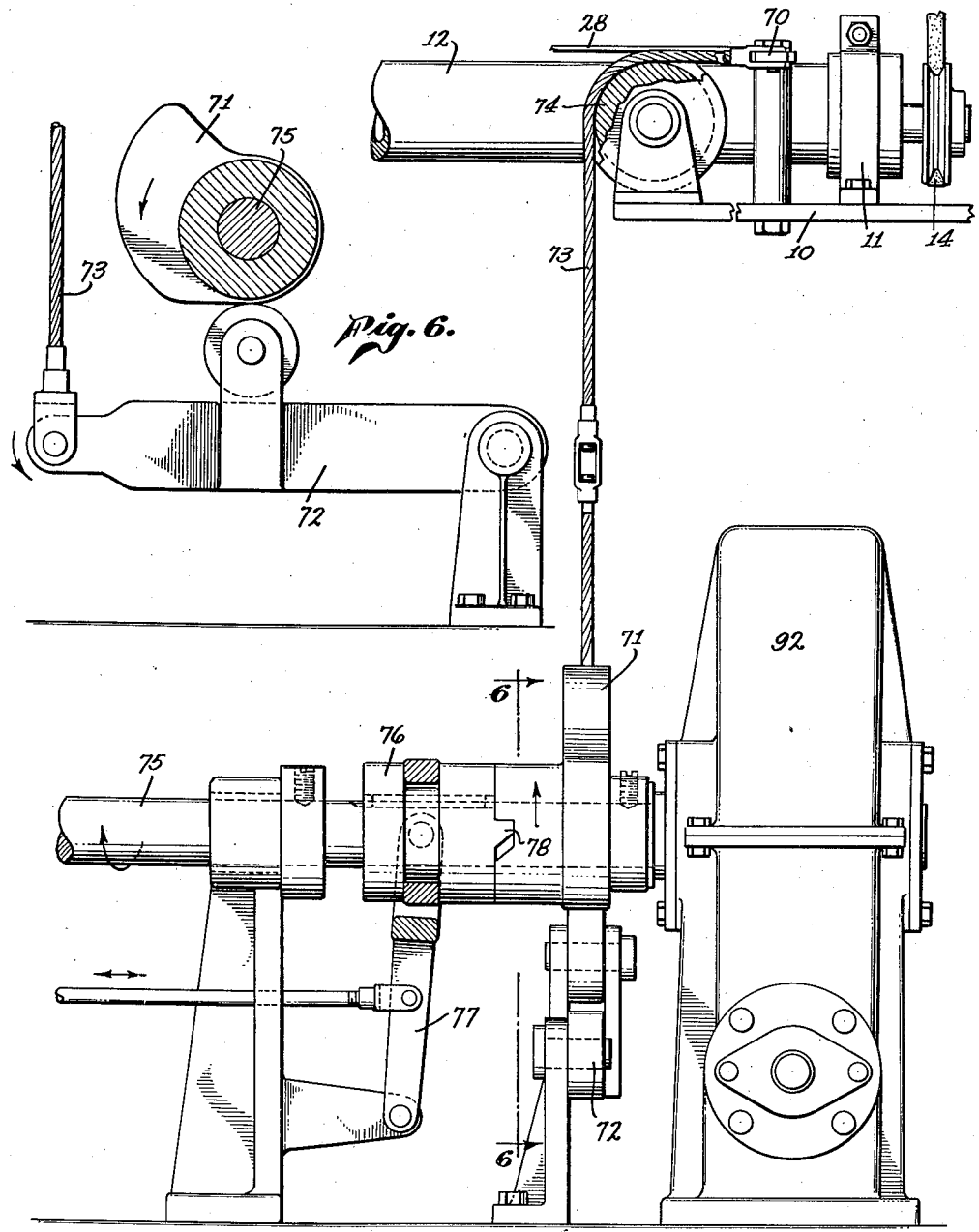
Fig. 5 is a side elevation upon a large scale of the right end of the machine as shown in Fig. 1, certain parts being broken away and shown in section.
Fig. 6 is a section taken about on the line 6—6 of Fig. 5, further illustrating details of the cam and cam lever for effecting the lifting of the undercutter carriage.

When the drill 18 and reamer 17 are out of contact with the pipe, the pipe is fed forward a distance corresponding to the pitch of the perforations. For this purpose the pipe rest 2 is provided with a longitudinal rack 47 on its under side (see Fig. 5, 1 and 2) that meshes with a feed pinion 48 on a ratchet shaft 49 that can be rotated with a step-by-step feed movement in either direction through ratchet devices 50 and 51 operated alternately by a cam-shaft 52, through links 53 and 54 actuated by rockers 55 and 56 driven by their corresponding cams 57 and 58 on the cam shaft 2. The ratchet devices 50 and 51 have ratchet wheels with inclined teeth that face in opposite directions, and loose ratchet arms 59 are provided, the hubs of which have spring-pressed ratchet pawls 60 to engage the teeth. Each pawl 60 has a projecting latch pin 61 running in a bayonet slot 62. This enables the pawl not being used, to be pulled up and locked in an inoperative position.

The construction should be such as to enable the amount of the feed to be regulated. In the present instance this is accomplished by providing the upper ends of the push rods with clamping bolts 63 running in longitudinal slots 64 in the arms 59. The other end of the cam shaft 52 actuates the rock lever 39 already described (see Fig. 3). For this purpose it is provided with a cam 65 that pushes up against a roller on a slide 66 guided in a bracket 67 and socketed at its upper end to thrust against the ball end of a push rod 68 pivoted at its upper end to the rock lever 39. This push rod is preferably made adjustable by means of a turnbuckle 69.

Figure 1A:
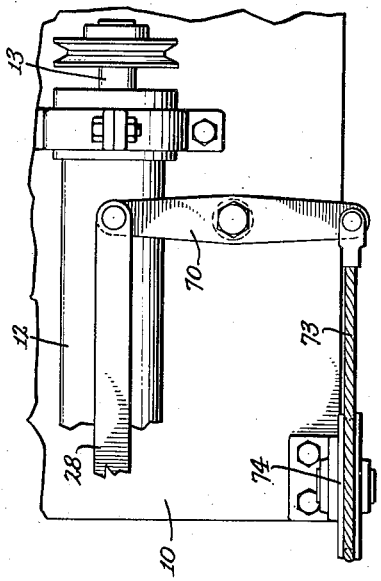
Fig. 1a is a fragmentary detail plan taken on the line 1a—1a of Fig. 1, of the right-hand end of the machine illustrated in Fig. 1, and illustrating some of the parts that cooperate to advance the undercutter into contact with the pipe wall.

Referring again to Figs. 1 and 1a and 5, the strap 28 is actuated by a rock-lever 70 which is actuated periodically in timed relation to the machine cycle by a cam 71 (see Fig. 6) that actuates a cam lever 72, the end of which is attached to a cord or cable 73, that passes up around a guide pulley 74 to attach to the lever 70. The cam 71 is loose on a driving shaft 75, but its hub operates a clutch member cooperating with a clutch member 76 that is splined onto the shaft 75 and shiftable by a clutch lever 77. This clutch member 76 has a single clutch tooth 78 for a purpose that will appear hereinafter. The shaft 75 drives a clutch member 79 at its end that cooperates with a clutch member 80 splined on a shaft 81 that drives the cam shaft 52 through bevel gears 82 and 83. Hand lever 84 near the operator's position controls the clutch lever 77 through a link 85, (see Fig. 1) and a similar operating lever 86 controls clutch member 80. The clutch member 80 also has a single tooth 87. By reason of the fact that there is only one tooth on this clutch member 80, and only one clutch tooth 78, these two clutches will always drive their driven parts in the same timed phase or relation.

Shaft 81 is rotatably supported at its outer end in the clutch member 79, and the clutch tooth 87 faces in the opposite direction from clutch tooth 78 (see Fig. 1). In order to rotate the shaft 52 it is necessary to place the bevel gear 82 on the far side of the shaft 52.

The perforations are drilled in longitudinal rows. As soon as a row is completed the operator opens the clutches at 76 and 80 to stop the drive and he then rotates the pipe on its own axis through a definite angle corresponding to the pitch of the perforations. This aligns the pipe properly for drilling the next row. He accomplishes this preferably by means of an indexing collar 88 (see Figs. 1 and 9) that is secured to the pipe 1 by a set screw, against the pipe collar 1a. This collar 88 has equidistant staggered sockets 89 in it corresponding to the pitch. A lever 90 is placed in the next socket and the pipe rotated until the lever 90 engages a stop notch 91 on the pipe rest. In addition to a rotation, the pipe is shifted longitudinally to align the lever 90 with the notch 91. This will align the pipe for the proper oriented pipe position and will also stagger the holes, which is the usual arrangement for perforations.

The driving shaft 75 is driven through a reduction gear 92 (see Fig. 1) from a motor 93. Water can be carried to the tool 17 by a suitable nozzle 94 (see Fig. 2). A cap 95 set over the chuck of cutter 17 and seating on the upper face of the carriage 16, substantially excludes water from the gears and bearings.

The mode of operation of the machine will now be briefly stated. The pipe 1 is run in from the left side as viewed in Fig. 1, so that it is supported on the rest 2 with its end located under the drill 18. In drilling the first hole the clutch at 76 is left open as there is yet no hole to be reamed by the undercutter 17. The bolt 63 on the end of the link 54 is then placed in the proper position in the slot 64 to give a feed to the pipe equal to the pitch of the perforations. As soon as the drill 18 has withdrawn from the first hole drilled, the clutch at 76 should be closed after which the machine will operate automatically to drill and ream a row of perforations. The cutter bar 12 is preferably about one-half the length of the pipe 1, as this enables it to perforate about half the length of the pipe, after which the pipe is reversed in position so as to perforate its other half.

As the cam shaft 52 rotates (see Fig. 2) cam 65 causes depression of the drill spindle 33, to drill the perforation and the return spring 40 withdraws it. As the cam 71 rotates (see Figs. 1 and 5) it actuates lever 70 to pull on strap 28, and this draws the sleeve 19 to the left (see Fig. 2). This pulls the cam bars 20 toward the left and their cam edges 24 pressing on the bottoms of the slots 21 of the yoke plate 22, cause the carriage 16 to rise sufficiently to bring the reamer tool 17 into the pipe wall, producing undercut holes as illustrated in Fig. 2. The spring 25 returns the cam bars and this permits the carriage to drop down again to its position of rest.

The cam-plate 22 is changed whenever liners of a different diameter are to be perforated, and should fit fairly accurately to the inner diameter of the liner. When the feed in one direction is being used, the pawl 60 of the other ratchet device is locked up in its bayonet slot 62, so that it is inoperative.

After the completion of a row of holes, the operator rotates the pipe 1 through a small angle by means of the lever 90 and ring or collar 88 (Figs. 1 and 9) to set the pipe in position for drilling the next row of holes. The staggered sockets 89 enable the drilled holes to be similarly staggered. The indexing ring or collar 88, of course, is changed to correspond to any desired pitch for the holes.

The machine can also be used if holes are previously drilled in the pipe in another machine first, and merely used for undercutting.

It is understood that the embodiment of the invention described herein is only one of the many embodiments this invention may take, and I do not wish to be limited in the practice of the invention, nor in the claims, to the particular embodiment set forth.

I claim:

1. In a pipe perforator and undercutter, the combination of a frame including a support for the pipe, drilling means supported on the frame for drilling a hole in the pipe from the outside, and means carried by the frame for simultaneously undercutting a previously drilled hole on the inside of the pipe and out of axial alignment with the drilling means.

2. In a pipe perforator and undercutter, the combination of a support for the pipe, a drill, means for supporting and rotating the drill, means for periodically advancing and withdrawing the drill to produce perforations in the pipe, an undercutter supported inside the pipe, out of alignment with the drill, means for effecting a feed movement after each perforation is drilled to effect alignment of the drilled perforation with the undercutter, means for rotating the undercutter, and means for periodically advancing and withdrawing the undercutter.

3. In a pipe perforator and undercutter, the combination of a support for the pipe, a drill, means for supporting and rotating the drill, advancing means for periodically advancing and withdrawing the drill to produce perforations in the pipe, an undercutter supported inside the pipe, out of line with the drill means for feeding the pipe forward after each perforation is drilled, to align a previously drilled perforation with the undercutter, a driven shaft extending into the pipe from its open end, means actuated by the shaft to rotate the undercutter, cam means within the pipe adjacent the undercutter, means extending into the open end of the pipe to cooperate with the cam means to advance the undercutter, and means for periodically shifting the last named means in timed relation to the advancing means for the drill, to effect the simultaneous undercutting of a drilled hole and the drilling of a new hole.

4. In an automatic pipe perforator and undercutter, the combination of a pipe rest, a drill frame, a rotary drill supported on the drill frame, a cutter bar extending into the pipe from its end, an undercutter carried on the cutter bar, means for periodically moving the pipe to align a drilled perforation with the undercutter, and means for periodically advancing and withdrawing the undercutter and for simultaneously advancing and withdrawing the drill.

5. In an automatic pipe perforator and undercutter, the combination of a pipe rest, a drill frame, a rotary drill supported on the drill frame, advancing means for periodically advancing the drill to form a perforation in the pipe, a cutter bar extending into the pipe from its end, an undercutter carriage at the inner end of the cutter bar, resting on the pipe bottom, means for periodically giving the pipe a feed movement, means operating periodically and in timed relation to the drill-advancing means to raise the carriage and thereby bring the undercutter into contact with the pipe wall at a point in line with a perforation.

6. In an automatic pipe perforator and undercutter, the combination of a pipe rest, a drill frame, a rotary drill supported on the drill frame, advancing means for periodically advancing the drill to form a perforation in the pipe, a cutter bar extending into the pipe from its end, an undercutter carriage at the inner end of the cutter bar, an undercutter tool carried thereby, means for periodically feeding the pipe longitudinally to bring a perforation in line with the undercutter, and means operating periodically and in timed relation to the drill-advancing means, for raising the undercutter carriage to bring the undercutter into contact with the pipe wall.

7. In an automatic pipe perforator and undercutter, the combination of a pipe rest, a drill frame, a rotary drill supported on the drill frame, advancing means for periodically advancing the drill to form a perforation in the pipe, a cutter bar extending into the pipe from its end, an undercutter carriage at the inner end of the cutter bar, an undercutter tool carried thereby, means for periodically feeding the pipe longitudinally to bring a perforation in line with the undercutter, and means operating periodically and in timed relation to the drill-advancing means raising the undercutter carriage to bring the undercutter into contact with the pipe wall, and means for effecting the rotation of the pipe through a definite angle after a longitudinal row of undercut perforations has been completed, to set the pipe for forming the next row of perforations.

8. In an automatic pipe perforator and undercutter, the combination of a pipe rest, a drill frame, a rotary drill supported on the drill frame, means for periodically advancing the drill to form a perforation in the pipe, a cutter bar extending into the pipe from its end, an undercutter carriage at the inner end of the cutter bar, an undercutter tool carried thereby located out of line with the drill, means for periodically feeding the pipe longitudinally to bring a perforation in line with the undercutter, and means for periodically raising the undercutter carriage to bring the undercutter into contact with the pipe wall, means for effecting the rotation of the pipe through a definite angle after a longitudinal row of undercut perforations has been completed, to set the pipe for forming the next row of perforations, and means for feeding the pipe in the opposite direction from the first feeding movement.

9. In an automatic pipe perforator and undercutter, the combination of a pipe rest, a drill frame, a rotary drill supported on the drill frame, means for periodically advancing the drill to form a perforation in the pipe, a cutter bar extending into the pipe from its end, an undercutter carried on the cutter bar, said pipe rest having a rack under the same with a feed pinion meshing therewith, means for periodically rotating the pinion to feed the pipe rest and the pipe forward to align a drilled perforation with the undercutter, means for periodically raising the undercutter to engage the pipe wall, means for effecting the rotation of the pipe on the pipe rest through a definite angle at the completion of a row of perforations, and means for effecting a periodical feeding movement for the feed pinion to feed the pipe rest and pipe in a reverse direction.

10. In a pipe perforator and undercutter, the combination of a frame, a substantially horizontal pipe rest, a cutter bar supported at one end of the frame to extend into one end of the pipe, an undercutter carried at the inner end of the bar, within the pipe, a rotary drill supported on the frame opposite the undercutter but out of line with the same, lifting means having a long part extending into the pipe along the cutter bar, means periodically cooperating therewith to lift the undercutter, to engage the pipe wall, and means for simultaneously advancing the rotary drill to drill a hole in the pipe wall.

11. In a pipe perforator and undercutter, the combination of a frame, a substantially horizontal pipe rest, a cutter bar supported at one end of the frame to extend into one end of the pipe, an undercutter carried at the inner end of the bar, within the pipe, a rotary drill supported on the frame opposite the undercutter, lifting means having a long part extending into the pipe along the cutter bar, means periodically cooperating therewith to lift the undercutter, to engage the pipe wall, and means for periodically advancing the rotary drill to drill a hole in the pipe wall, and clutches for controlling the operation of the lifting means and the advance of the drill, with means for controlling the clutches from a point near the drill.

12. In a pipe perforator and undercutter, the combination of a frame, a substantially horizontal pipe rest, a cutter bar supported at one end of the frame to extend into one end of the pipe, an undercutter carried at the inner end of the bar, within the pipe, a rotary drill supported on the frame opposite the undercutter, but out of axial alignment therewith, lifting means having a long part extending into the pipe along the cutter bar, a carriage within the pipe carrying the undercutter, said lifting means including a cam-plate on the carriage cooperating with the long part to raise the carriage to advance the undercutter into engagement with the wall of the pipe, and means for simultaneously advancing the rotary drill to engage the wall of the pipe.

ANDREW J. COLMERAUER.